United States Patent
Kauderer

[11] 3,862,478
[45] Jan. 28, 1975

[54] TOOL FOR SWARF-PRODUCING MACHINING OPERATIONS

[76] Inventor: Alfred Kauderer, Friedhofstrasse 24, 7332 Eislingen/Fils, Germany

[22] Filed: Mar. 8, 1973

[21] Appl. No.: 339,452

[30] Foreign Application Priority Data
Mar. 10, 1972 Germany............................ 2211777

[52] U.S. Cl.................. 29/95 R, 29/96 R, 408/143
[51] Int. Cl............................................... B26d 1/00
[58] Field of Search............ 29/95 R, 96 R; 408/143

[56] References Cited
UNITED STATES PATENTS
1,432,467  10/1922  Karlsen............................... 82/36 R
2,096,137  10/1937  Shaw..................................... 29/95 R
2,426,359  8/1947   Lankheet............................. 408/143
2,944,323  7/1960   Stadler................................. 29/95 R FOREIGN PATENTS OR APPLICATIONS
1,101,908  3/1961   Germany............................. 29/95 R Primary Examiner—Leonidas Vlachos
Attorney, Agent, or Firm—Sughrue, Rothwell, Mion, Zinn & Macpeak

[57] ABSTRACT

The invention relates to a tool for swarf-producing machining operations on a workpiece, the tool having a head carrying or comprising one or more cutter edges and also a shank made in one piece with the head.

7 Claims, 7 Drawing Figures

PATENTED JAN 28 1975  3,862,478

TOOL FOR SWARF-PRODUCING MACHINING OPERATIONS

It is known that the vibrations occurring within the system with the many different types of machine elements are undesirable, since they result in considerable disadvantages. This applies more particularly in respect of the cutting tools and holders of tools operating with formation of swarf, so that frequently the defects and disadvantages arising with the swarf-producing machining operation and also the performance of the machining tools are not inconsiderably influenced by the vibrations which occur. If it is possible successfully to damp considerably the vibrations occurring with cutting tools, it is possible to provide advantages which have an effect firstly on the quality and accuracy of the machined workpieces and also on the endurance strength of the tools which are used. However, also other advantages are produced, such as making possible a substantially higher cutting speed, so that the machining times with machining operations with which swarf is produced can be considerably shortened. This is also important for automatic machine tools, because the productivity or efficiency can be considerably improved on account of the longer endurance strength of the cutting tools and higher cutting speed, as a result of which the machined workpieces present an improved uniformity and accuracy than hitherto.

For achieving the object as set forth, it is proposed according to the invention to provide an arrangement with tools of the type under consideration which is such that the shank consists of at least two parts which are positively or non-positively connected to one another, the boundary surface or surfaces of said parts extending at an acute angle to the longitudinal axis or plane of the shank, and in fact either at a specific position, namely, advantageously in the region or at the height of the ends of the inclined separation or boundary surfaces, or with the entire surface along the separation or boundary surfaces.

The tool under consideration is advantageously so constructed that at least one wedge-shaped recess is disposed in the rod-like or shank-like part of the tool, into which recess is fitted a wedge which is connected to the other part. The wedge itself may optionally consist of two parts, which are likewise again connected to one another.

The parts of the tool can consist of the same or of substantially the same material or of different material. If its material is the same or substantially the same, as for example metal and more particularly steel, the connection of the parts of the tool is effected at a certain position, and advantageously where the tip of a wedge-shaped part is disposed. If the parts of the tool consist of different materials, as for example of a hard metal on the one hand and a soft metal or a metal alloy, or of other materials, such as synthetic plastics or the like, on the other hand, the parts of the tool are for example cast with one another, metallically bonded to one another by soldering or even stuck to one another.

The subject of the invention is illustrated in FIGS. 1 to 7 of the drawings in respect of some particularly preferred embodiments, which are hereinafter more fully described in detail. In the drawings:

FIG. 7 shows the rear clamping end of a drill, milling cutter or the like.

Figure 1:
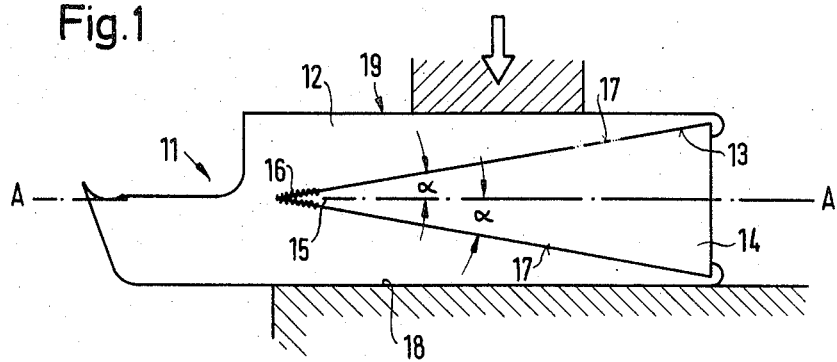
FIG. 1 is a side elevation of a cutting tool according to the invention as regards a first embodiment.

As can be seen from FIG. 1, the cutting tool 11 has in its shank 12 a wedge-shaped recess 13 which is open towards the rear and which is preferably symmetrically arranged. Inserted into the wedge-shaped recess 13 is the wedge 14, which is connected at its forward end 15 by a welding 16 to the shank 12. The surfaces 17 of the wedge-shaped recess 13 are inclined at an acute angle (angle α) to the longitudinal axis A—A of the shank 12. The upper surface 19 of the shank 12, on which is operative a pressure element for clamping purposes, is situated in a parallel position to the support surface 18 of the shank 12. The cutting tool designed according to the invention is in practice used in the same way as the usual cutting tools.

Figure 2:
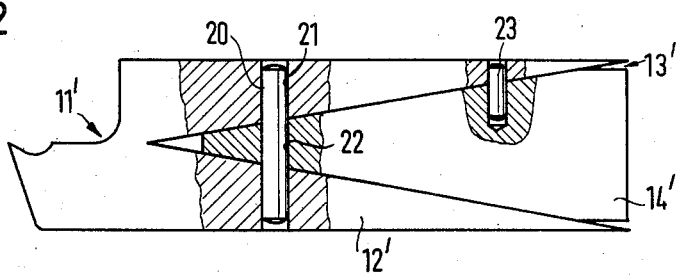
FIG. 2 is a cutting tool of a second embodiment.

A second constructional form of a cutting tool is shown in FIG. 2; with this tool also, the shank 12' of the cutting tool 11' has a wedge-shaped recess 13', into which is inserted the wedge 14'. The connection between the shank 12' and the wedge 14' is effected by means of a cylindrical pin 20, which is inserted into the bore 21 in the shank 12' and the bore 22 in the wedge 14'. The rearward end of the wedge 14' can optionally be secured by a second cylindrical pin 23.

Figure 3:
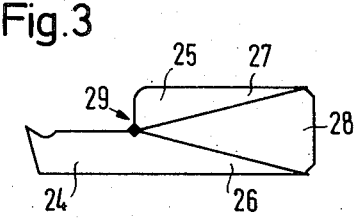
FIGS. 3 and 4 are details concerning the connection of the separate parts of a cutting tool constructed according to the invention.

The cutting or turning tool according to FIG. 3 is very similar to that according to FIG. 1, but it is composed of three parts, of which the two parts 24 and 25 form the shank, between the respective rearward ends 26 and 27 of which is arranged the wedge 28 as the third part. The connection of the three parts is effected by means of a welded union 29 at the position where the three parts 24, 25 and 28 meet.

Figure 4:
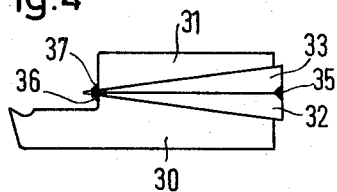

However, it is also possible to construct the turning tool according to the invention in the form which is shown in FIG. 4. The shank is formed of the two parts 30 and 31, between which is disposed a wedge 34 consisting of the two parts 32 and 33. The two wedge sections 32 and 33 are connected to one another at their rearward end by the weld seam 35. At the forward end, the lower wedge section 32 is connected by a weld seam 36 to the lower shank part 30 and the upper wedge section 33 is connected by means of the weld seam 37 to the upper shank part 31.

Figure 5:
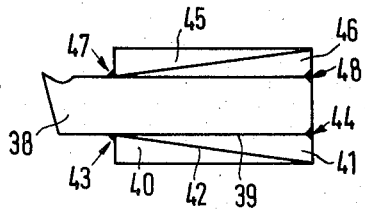
FIGS. 5 and 6 are two further embodiments of a cutting tool.

The turning tool according to FIG. 5 comprises a straight shank 38, beneath the bottom side 39 of which are arranged two wedges 40 and 41, of which the wedge surfaces 42 extend at an acute angle to the underside 39 of the shank. The lower wedge 40 is connected at its forward end by means of the weld seam 43 to the shank 38, while the upper wedge 41 is connected at its rearward end by means of the weld seam 44 to said shank. In laterally inverted relationship to the bottom wedges 40 and 41 are the two upper wedges 45 and 46, which are connected by the weld seams 47 and 48, respectively, to the shank 38.

Figure 6:
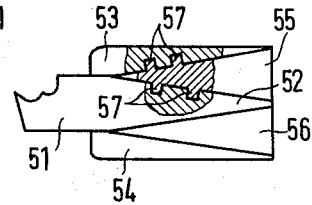

With the constructional example of a turning tool according to FIG. 6, the shank 51 is made flattened and wedge-shaped at its rearward end 52 on two sides which are opposite one another. Arranged above and beneath the shank 51 are two wedge-shaped parts 53 and 54, which are connected to the shank by the wedges 55 and 56 of a soft metal alloy. For forming the wedges 55 and 56, the molten metal is poured in a simple manner between the parts 51, 53 and 54 which are to be connected to one another and into the wedge-shaped spaces which have been covered laterally. In order to achieve a better adhesion and connection, blind bores 57 or like depressions can be arranged in the surfaces of the parts 51, 53 and 54, the poured metal penetrating into said depressions.

In the case where the wedge-shaped parts of the turning tools according to FIGS. 1 to 5 also consist of softer material than the other parts of the said tools, the connection can be effected in corresponding manner. In the event of synthetic plastics, such as more particularly fibres, being used, the connection of the synthetic plastic part to the shank of the turning tool in the manner which is illustrated in FIG. 2 is advantageous.

The wedge-shaped part inserted into a wedge-like recess can optionally be embraced claw-fashion at its rearward end, as can be seen in FIG. 1.

Figure 7:
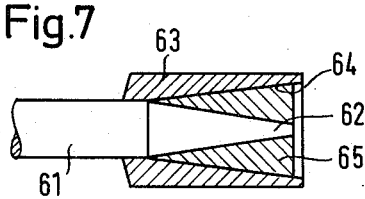

In a manner similar to the turning tool according to FIG. 6, a drill, milling cutter or like cutting tool can be formed at its rearward end in the manner shown in FIG. 7. The shank 61, for example, of a drill, is made cone-shaped at its rearward end 62 and is enclosed by a cylindrical sleeve 63, of which the internal wall 64 is made conical. The wedge-shaped space between the end 62 of the drill shank and the sleeve 63 is filled by casting therein a soft metal alloy, so that the two parts are connected to one another by an annular wedge 63.

I claim:

1. A tool for swarf-producing machining operations comprising:
   a. a shank having a wedge shaped recess in a first end, each of the surfaces of said wedge shaped recess being disposed at an acute angle to the longitudinal axis of said shank;
   b. a cutting surface at a second end of said shank; and
   c. a wedge shaped member inserted into said wedge shaped recess in said shank and fastened to said shank.

2. The tool according to claim 1 wherein said wedge shaped member is fastened to said shank by at least one pin inserted into aligned holes in said shank and said wedge shaped member.

3. The tool according to claim 1 wherein said wedge shaped member is welded to said shank at its apex.

4. The tool according to claim 1 wherein said shank comprises a first and a second part, each of said parts engaging a wedge surface of said wedge shaped member, said parts being welded together and to said wedge shaped member at the apex of said member.

5. The tool of claim 4 wherein said wedge shaped member comprises first and second sections, the boundary surface of said sections lying along the longitudinal axis of said member.

6. A tool for swarf-producing maching operations comprising:
   a. a shank having a cutting surface on one end;
   b. a first pair of wedge members lying along opposite sides of said shank; and
   c. a second pair of wedge members, each lying along the surface of said first wedge member, the boundary surface between said first and second wedge members being disposed at an acute angle to the longitudinal axis of said shank.

7. A tool for swarf-producing machining operations comprising:
   a. a shank having a wedge shaped first end;
   b. a cutting surface on a second end; and
   c. a pair of wedge shaped members disposed on opposite sides of said shank such that a wedge shaped recess is formed between each of said wedge shaped members and said wedge shaped portion of said shank, the recesses being filled by a solidified metal alloy.

* * * * *